United States Patent [19]
Thomas

[11] Patent Number: 5,127,520
[45] Date of Patent: Jul. 7, 1992

[54] CLAMSHELL AIRCRAFT BRAKE ASSEMBLY SHIPPING CONTAINER

[76] Inventor: William A. Thomas, 2444 Santa Ynez Way, Palm Springs, Calif. 92264

[21] Appl. No.: 737,785

[22] Filed: Jul. 30, 1991

[51] Int. Cl.⁵ .............................................. B65D 85/02
[52] U.S. Cl. ................................... 206/303; 220/4.22
[58] Field of Search .............. 206/303, 335, 408, 445, 206/446, 449, 452; 220/4.22, 4.23, 4.24

[56] References Cited

U.S. PATENT DOCUMENTS

| | | | |
|---|---|---|---|
| 2,613,807 | 10/1952 | Higbee | 206/319 |
| 2,708,509 | 5/1955 | Gould et al. | 220/4.22 |
| 2,728,581 | 12/1955 | Goebert et al. | 220/4.22 |
| 3,727,795 | 4/1973 | Willsey | 220/4.24 |
| 3,762,600 | 10/1973 | Kreutzweiser | 220/4.24 |
| 3,913,735 | 10/1975 | Durbin | 206/303 |
| 4,729,478 | 3/1988 | Thomas | 206/591 |
| 4,790,430 | 12/1988 | Thomas | 206/303 |
| 5,048,679 | 9/1991 | Thomas | 206/303 |

FOREIGN PATENT DOCUMENTS 0128422 6/1931 Austria ............................... 206/445
0870058 6/1961 United Kingdom .............. 220/4.22

Primary Examiner—Jimmy G. Foster
Assistant Examiner—R. Zimmerman
Attorney, Agent, or Firm—Poms, Smith, Lande and Rose

[57] ABSTRACT

A lightweight impact resistant container for protecting aircraft brake assembly during shipment and minimizing the required amount of handling during installation and removal of the brake assembly from the aircraft is disclosed. The device is comprised of a cylindrical tube, a base portion, and a top portion, each of which are divided in half along the axis of the cylindrical tube. The two halves are hinged together to allow the two halves to pivot open and shut. When the container is shut, latches are used to secure the container in a closed position. The container further includes a threaded rod assembly with two conical members threaded on the rod for supporting and holding the brake assembly in a fixed position during shipment and storage. The threaded rod assembly mechanically interfits with the top portion and the base portion of the container.

20 Claims, 2 Drawing Sheets

CLAMSHELL AIRCRAFT BRAKE ASSEMBLY SHIPPING CONTAINER

I. FIELD OF INVENTION

This invention relates to containers for shipping aircraft brake assemblies and more particularly to clamshell design containers that cross-sectionally open and close so as to facilitate removal and replacement of the aircraft brake assemblies.

II. BACKGROUND OF INVENTION

Aircraft brake assemblies require regular repair, servicing, or refurbishing during the life of the brake assembly. Therefore, the brake assemblies are regularly removed from the aircraft, transported to a service location, then shipped back to a location for installation on an aircraft.

The aircraft brake assemblies include a stack of rotor and stator disks that are often constructed from carbon, a high temperature-resistent material. However, carbon is also a brittle material, and therefore easily damaged from impact or shock. As a result, extra care must be taken in the handling of the brake assemblies to avoid any damaging impact to the brake disks. The problem of the brittle carbon disks is exacerbated by the high cost of carbon material, for example, each stack of carbon disks used in an aircraft brake assembly may cost between $20,000 to $30,000.

The brittleness of the carbon disks requires specially designed containers to protect the disks from damage during shipping. Attempts to solve this problem have resulted in several aircraft brake shipping container designs. For example, U.S. Pat. No. 4,790,430 issued to W. A. Thomas on Dec. 13, 1988 discloses a resilient, lightweight aircraft brake assembly shipping container comprised of a cylindrical tube and base member with a removable top closure. In order to ship the brake assembly in the container, the top closure is removed, the aircraft brake assembly is inserted into the tube, and the top closure is replaced. The container thus provides an inexpensive, safe container for shipping the brake assemblies.

Another type of container for hollow cylindrical parts is disclosed in U.S. Pat. No. 3,913,735 issued to D. R. Durbin on Jun. 22, 1973. The container is comprised of a base and a hollow cover, with a connecting bolt securing the base and cover together. The container also includes elements for positioning and bearing against the hollow cylindrical parts inside the container.

Although these container designs may provide improved shipping of the brake assemblies, a problem still exists in the difficulty of removing and replacing the brake assemblies in the container, because the brake assembly must be slid into the container. Moreover, the excessive handling of the disks that is required to remove and replace the brake assemblies creates an additional problem. For example, in order to install the disks on the aircraft, the used brake assembly is first removed and placed in a remote location. The new brake assembly is then removed from the container and typically placed on a workbench in order to prepare the brake assembly for installation. The brake assembly is then mounted on the aircraft. The used brake assembly is then retrieved from the remote location and packed in a container for shipping to a repair site. The extensive maneuvering of the brake assemblies therefore increases the probability that the carbon disks will be dropped, broken, or damaged. Moreover, after the brake assemblies are removed from the shipping container, the assemblies are often not secured to a stable object as they are moved from location to location, thereby increasing the likelihood of damage to the carbon disks. Therefore, a need exists for an improved aircraft brake assembly shipping container that protects the carbon disks during shipping and minimizes the necessary handling of the brake assemblies during installation to and removal from the aircraft.

Accordingly, the principal object of this invention is to protect the carbon disks during shipping.

Another object of the invention is to increase the convenience and minimize handling of the aircraft brake assemblies during replacement of the aircraft brake assemblies.

A further object of the present invention is to provide an aircraft brake assembly shipping container that is stackable.

A still further object of the invention is to provide a container for shipping aircraft brake assemblies that is both lightweight and impact-resistant.

These and other objects of the present invention will now become apparent from a review of the drawings and the following description of the preferred embodiments.

II. SUMMARY OF THE INVENTION

In accordance with a specific embodiment illustrating the principles of the present invention, a container for protecting the carbon disks of an aircraft brake assembly during shipping is comprised of a cylindrical tube having a first and a second end, the tube further being axially divided so as to comprise a separable right half and a separable left half, each of the halves further including a first edge and a second edge extending axially down the length of the tube; a top portion attached to the first end of the cylindrical tube, the top portion further being divided so as to form a separable right top portion half corresponding to the cylindrical tube right half, and a left top portion half corresponding to the cylindrical tube left half; a base portion attached to the second end of the cylindrical tube, the base portion further being divided so as to form a separable right base portion half corresponding to the cylindrical tube right half, and a left base portion half corresponding to the cylindrical tube left half; means for securing the left halves and the right halves of the cylindrical tube, top portion, and base portion together such that the left and right halves may pivot between an open position and a closed position; and means for supporting and holding the brake assembly within the cylindrical tube, the supporting means engaging the base portion and the top portion of the container.

From another standpoint, the container is similar to a clamshell in that it has two half cylindrical portions which are hinged together, and which may be opened so that the brake assemblies may be readily raised and lowered into either or both halves thereof. With two lifting straps being provided, the container may be placed under the airplane adjacent the wheel hub, and the entire transfer accomplished at this point. First the new brake assembly is temporarily raised using one lifting strap, the packing support cones and shaft are removed, and the new brake assembly is lowered back into one half of the clamshell container. Then the old worn-out brake is removed from the axle using the second lifting strap, the packing support cones and shaft are secured, and the old brake assembly is lowered into the other half of the clamshell container, with both brakes momentarily side-by-side. Then the new brake assembly is raised and mounted on the axle; and finally the clamshell container is then securely loaded in its closed configuration.

DETAILED DESCRIPTION

Figures 1, 2:
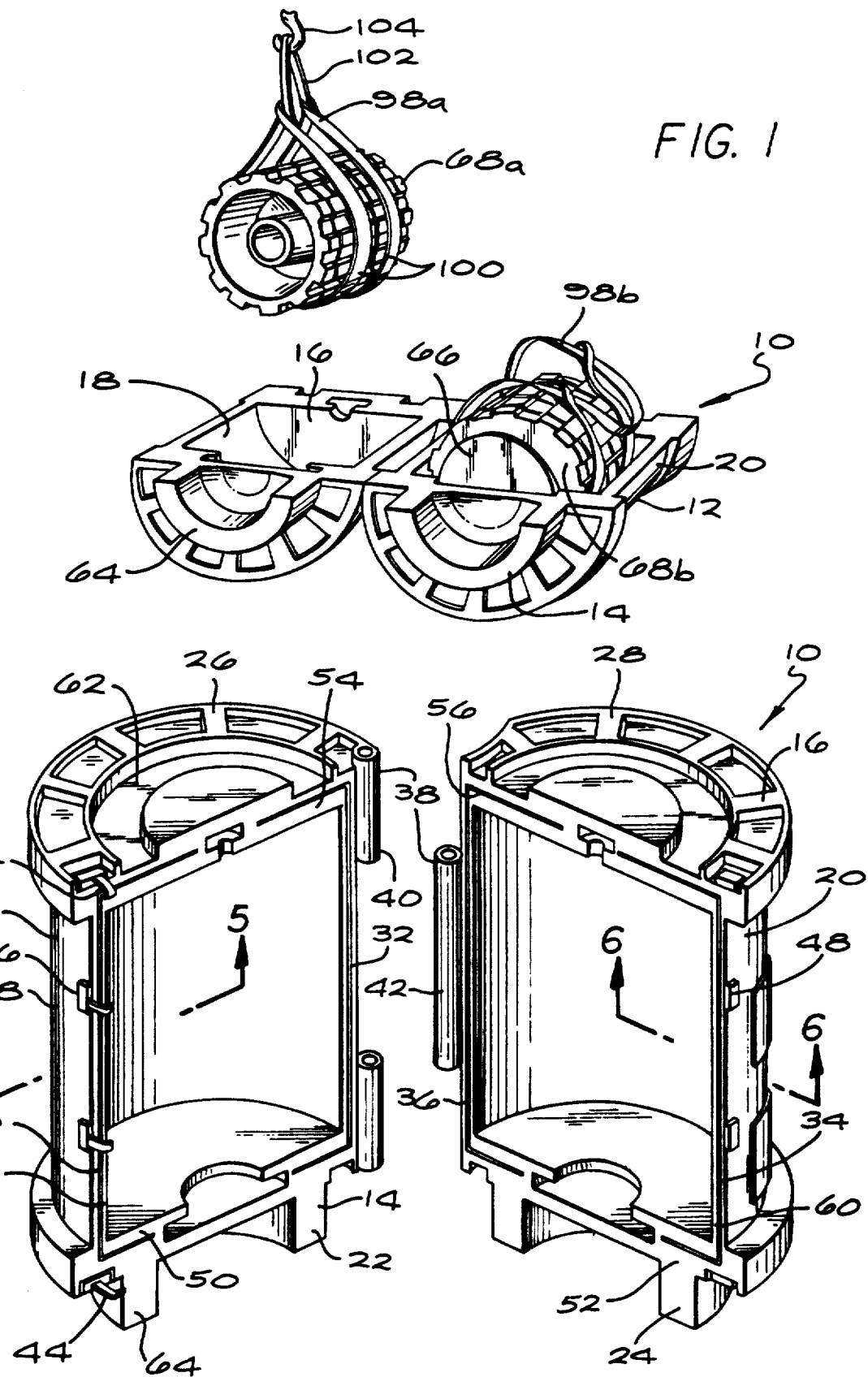
FIG. 1 is a perspective view of the clamshell container, illustrating a new and a used brake assembly as used with the container.
FIG. 2 is a perspective view of the clamshell container showing the container right half and container left half in a separated position.

Referring first to FIGS. 1 and 2, the container 10 is shown in perspective. The container 10 comprises a cylindrical tube 12, a base portion 14, and a top portion 16. In the preferred embodiment, the cylindrical tube 12, base portion 14, and top portion 16 are rotationally molded from a high density polyethylene material. Therefore the container is durable, yet lightweight. The cylindrical tube 12 is cross-sectionally split in half along the vertical axis of the tube 12 to form a left cylindrical tube half 18 and a right cylindrical tube half 20. The base portion 14 is also split in half along a line corresponding to the vertical axis of the cylindrical tube 12 so as to form a left base portion half 22 and a right base portion half 24. The top portion 16 is also divided along the vertical axis of the cylindrical tube 12 to form a left top portion half 26 and a right top portion half 28.

Referring now more particularly to FIG. 2, the left cylindrical tube half 18 further defines a left first cut edge 30 and a left second cut edge 32. The right cylindrical tube half also defines a right first cut edge 34 and a right second cut edge 36. When the container 10 is in a closed position, the first cut edges 30 and 34 are in a mating configuration, and the left cut edges 32 and 36 are in a mating configuration. The base portion left half 26 further defines a left base cut edge 50, and the base portion right half 24 also defines a right base cut edge 52. The two cut edges 50 and 52 meet in a mating configuration when the container 10 is in a closed position, so as to seal the base portion 14. Similarly, the top portion left half 26 defines a top left cut edge 54. and the top portion right half 28 defines a top right cut edge 56. The two cut edges 54 and 56 meet in a mating configuration when the container 10 is in a closed position so as to seal the top portion 16.

In the embodiment shown, the left portions 18, 22, and 26 are secured to the right portions 20, 24, and 28 along the cylindrical tube halves second edges 32 and 36 by a plurality of hinge members 38. For each of the hinge members 38, a hinge member first part 40 is formed on the left cylindrical tube half second edge 32, and a hinge member second part 42 is formed on the right cylindrical tube half second edge 36. Therefore, when the hinge members first part 40 are assembled with the hinge members second part 42, the left and right halves of the container are able to pivot to a fully open position, as shown in FIG. 1, or to a fully closed position.

When the container 10 is in a closed position, the left halves 18, 22, and 26 are secured with the right halves 20, 24, and 28 through the use of a plurality of latches 44. As shown in FIG. 2, four butterfly latches 44 are used in the preferred embodiment to secure the container 10 in a closed position. The butterfly latches 44 each comprise a male portion 46 and a female portion 48. The latch 44 is designed so that the male portion 46 easily latches into the female portion 48. The male portion 48 is then tightened to secure the latch. These type of latches are known to those skilled in the art. Two of the latches 44 are located on the cylindrical tube halves 18 and 20. One of the latches 44 is mounted on the base portion halves 22 and 24, while another latch 44 is mounted on the top portion halves 26 and 28.

When the latches are mounted on the cylindrical tube halves 18 and 20, the male portion 46 of each of the butterfly latches 44 is mounted on the outer surface of the left cylindrical tube half 18 in close proximity to the first edge 30, and the corresponding female portion 48 is mounted on the outer surface of the right cylindrical tube half 20 in close proximity to the first edge 34.

When the latches are mounted to the base portion halves 22 and 24, the male portions 46 are mounted on the bottom surface of the left base portion half 22 in close proximity to the left base cut edge 50. The female portions 48 are mounted on the bottom surface of the right base portion half 24 in close proximity to the right base cut edge 52. When the latches are mounted to the top portion halves 26 and 28, the male portions 46 are mounted on the top surface of the left top portion half 26 in close proximity to the left top cut edge 54. The female portions 48 are mounted on the top surface of the right top portion half 28 in close proximity to the right top cut edge 56.

In an alternative embodiment, the hinge members 38 may be replaced with latches so that the container 10 includes latches along both the cylindrical tube first edges 30, 34 and the second edges 32, 36. Therefore, in this alternative embodiment, the cylindrical tube halves 18 and 20 are completely separable.

Figure 5:
FIG. 5 is an exploded view of the first edge of the left half of the cylindrical tube, taken along line 5—5 of FIG. 2.
Figure 6:
FIG. 6 is an exploded view of the first edge of the right half of the cylindrical tube, taken along line 6—6 of FIG. 2.

Referring now to FIGS. 5 and 6, an additional detail of the present invention is shown that enhances the latching of the container 10 in a closed position. FIGS. 5 and 6 show an enlarged view of the first cut edges 30 and 34 of both the left cylindrical tube half 18 and the right cylindrical tube half 20. The left first cut edge 30 of the left cylindrical tube half 18 is formed with a duct 58 extending down the length of the edge 30 from the top portion 16 to the base portion 14. The first cut edge 34 of the right cylindrical tube half 20 is formed with a corresponding ridge 60, also extending down the length of the edge 34 from the top portion 16 to the base portion 14. Therefore, when the container 10 is closed, and the first edges 30 and 34 contact, the mating duct 58 and ridge 60 prevent the cylindrical tube halves 18 and 20 from shifting and separating from each other.

Referring back to FIG. 2, another feature of the present invention is shown. In this feature, an annular groove 62 is formed on the top surface of the top portion 16. A corresponding annular ridge 64 is formed on the bottom surface of the base portion 14, such that the base portion annular ridge 64 fits into the top portion annular groove 62 when the containers are stacked. Alternatively, the base portion 14 may be formed with the groove 62, and the top portion 16 formed with the ridge 64. The interfitting ridge and groove cause the containers 10 to be stable when several containers 10 are stacked on top of each other. Furthermore, to provide additional stability to the stacked containers, the base portion 14 and top portion 16 have a greater diameter than the cylindrical tube 12.

Figure 3:
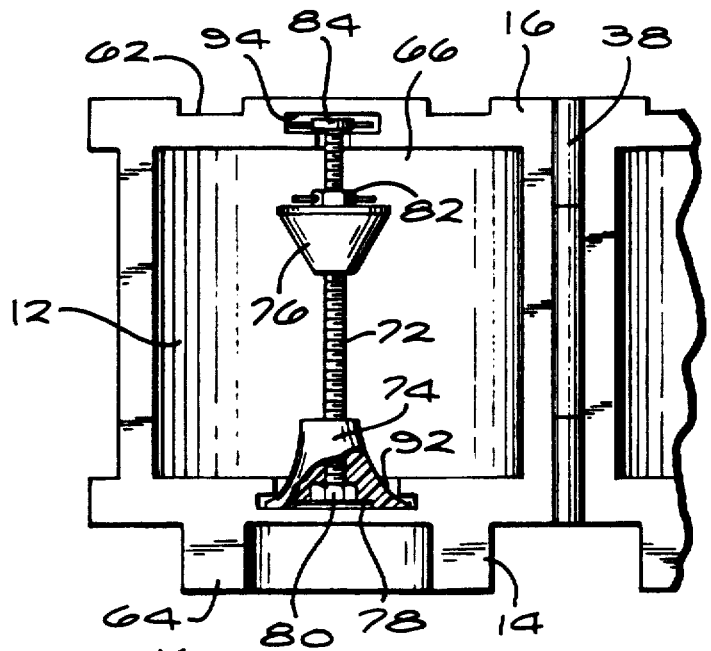
FIG. 3 is front view of the left half of the container, showing the brake disk supporting and holding means.

Referring now to FIG. 3, the brake assembly supporting and holding means 66 is best shown. The supporting and holding means 66 is designed to be installed within the interior of the cylindrical tube 12 of the container 10 and is designed to secure a brake assembly 68 into position so as to prevent impact and damage to the brittle carbon disks 70 during shipment or storage. The supporting and holding means 66 is primarily comprised of a threaded rod 72, a lower truncated conical member 74, an upper truncated conical member 76, a base nut plate 78, a base nut 80, a wing nut 82, and a cap screw 84. The base nut 80 is mounted on the base nut plate 78. The threaded rod 72 is then engaged into the base nut 80 so as to be mounted in an upright position, perpendicular to the base nut plate 78. The lower conical member 74 is molded around the base nut plate 78 and base nut 80, with the truncated portion facing the direction of the center of the threaded rod. The upper truncated conical member 76, wing nut 82, and cap screw 84 are removably engaged with the threaded rod 72.

Figure 4:
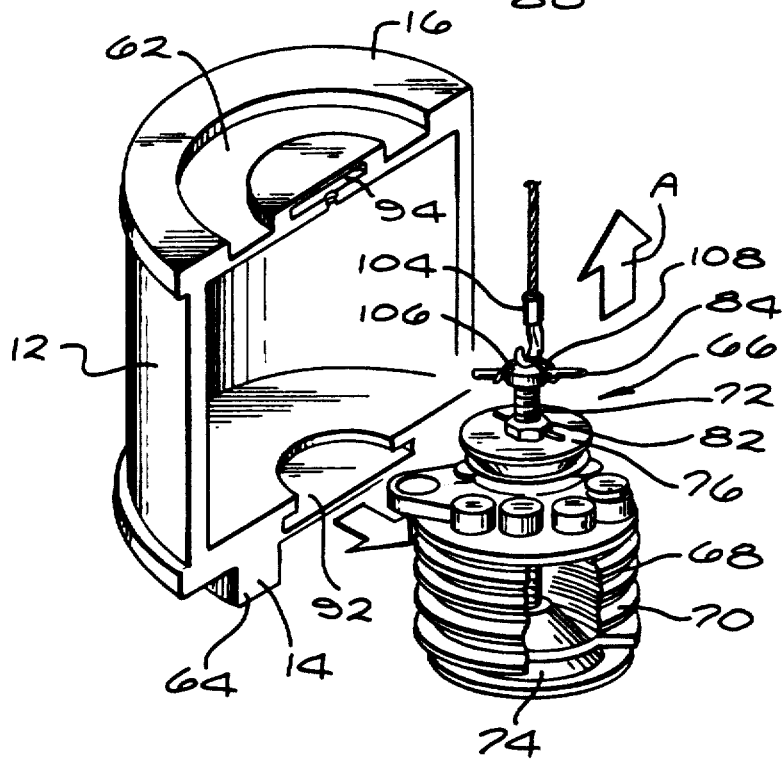
FIG. 4 is a perspective view of the left half of the container showing the brake assembly removed from one half of the container and ready for lifting.

When the brake assembly 68 is to be installed on the supporting and holding means 66, the cap screw 84, wing nut 82, and upper conical member 76 are removed from the threaded rod 72, in that order. The brake assembly 68 is then slid over the threaded rod 72 so as to engage the lower conical member 74, as shown in FIG. 4. The upper conical member 76 is next inserted onto the threaded rod 72 with the truncated portion facing and contacting the brake assembly 68. The wing nut 82 is then screwed onto the threaded rod 72 to tighten the upper conical member 76 against the brake assembly 68. Finally, the cap screw 84 is screwed onto the upper end of the threaded rod 72.

Once the brake assembly 68 is installed on the supporting and holding means 66 as shown in FIG. 4, the combined assembly is easily inserted into one of the halves 18 and 20 of the container 10. As best shown in FIG. 4, each of the base portion halves 22 and 24 defines a base portion slot 92 capable of receiving a portion of the lower conical member 74. Each of the top portion halves 26 and 28 also defines a top portion slot 94 capable of receiving the cap screw 84. Once the lower conical member 74 and cap screw 84 are slid into the slots 92 and 94, the threaded rod 72 is aligned with the vertical axis of the cylindrical tube 12. When the container 10 is subsequently closed, the supporting and holding means 66 is held in a fixed position, and the threaded rod, upper conical member, and lower conical member support and hold the brake assembly, thereby preventing damaging impact to the carbon disks 70.

The invention may further include several additional features by which the brake assembly 68 is easily and safely lifted from the container. The first of these features is a first means for lifting 96 the brake assembly 68. Referring to FIG. 1, the first lifting means 96 is preferably comprised of a strap member 98. The strap member 98 provides two lengths of strap 100 that surround the circumference of the brake assembly 68 in a parallel spaced apart relationship. The strap member 98 further provides a loop 102 that enables a hook 104 to pick up the brake assembly 68. When the brake assembly 68 is lifted by the hook 104, the two lengths of strap 100 tighten around the circumference of the brake assembly 68 so as to securely lift the assembly 68. When the brake assembly 68 is placed onto a surface, the two lengths of strap 100 loosen around the circumference of the brake assembly 68. The first lifting means 96 may be used to lift the brake assembly 68 alone, or to lift the brake assembly 68 mounted on the support and holding means 66.

As best shown in FIG. 4, the supporting and holding means 66 may also include a second means 106 for lifting the brake assembly 68 by the supporting and holding means 66 in an upward direction, as shown by arrow A in FIG. 4. Through the use of the second lifting means 106, the brake assembly 68 may easily be lifted and placed onto a work table such that the assembly 68 is resting on the base nut plate 78 and lower conical member 74. In the embodiment shown in FIG. 4, the second lifting means 106 is comprised of a band 108 that is looped around the cap screw 84 so as to enable the hook 104 to lift the brake assembly 68.

Referring again to FIG. 1, the preferred method of using the present invention is explained in detail. The container 10, containing a refurbished or new brake assembly 68a assembled onto the supporting and holding means 66 is rolled under the wing of a plane. The container 10 is opened so as to expose the refurbished or new brake assembly 68a. In the preferred embodiment, the brake assembly 68a will have a first strap member 98a surrounding the assembly 68a to facilitate the lifting of the brake assembly 68a. The container 10 also preferably contains a second strap member 98b. The operator lifts the new brake assembly 68a from the opened container and places it on a work bench in order to remove the support and holding means 66 from the new assembly 68a. The assembly 68a is then placed back into one of the halves 18 and 20 of the cylindrical tube 12. The second strap member 98b is removed from the empty half of the container 10 and placed around the old brake assembly 68b on the aircraft. The old brake assembly 68b is removed, and the support and holding means 66 is installed in the old brake assembly 68b. The old brake assembly 68b with the support and holding means 66 is then placed in the empty half of the container, with the second strap member 98b still surrounding the brake assembly 68b. The new brake assembly 68a is then lifted from the container 10 by the strap member 98a, and installed on the axle of the aircraft. FIG. 1 shows the described method during this step. The first strap member 98a is removed from the new brake assembly 68a, and placed in the empty half of the container 10. The container 10, containing the used brake assembly 68b with the second strap member 98b surrounding the assembly 68b, and the first strap member 98a, is closed, latched shut, and rolled out from under the wing of the aircraft. The container is then ready for shipment to a repair site.

For completeness, the dimensions of the embodiment shown in FIGS. 1 and 2 are disclosed. The cylindrical tube 12 is approximately twenty-five inches in length between the base portion 14 and the top portion 16. The base portion 14 and top portion 16 each provide approximately an additional three inches in length to the container. The inner diameter of the cylindrical tube 12 is approximately twenty-eight inches. The outer diameter of both the base portion 14 and the top portion 16 is approximately thirty and one-quarter inches. The inner diameter of the top portion annular groove 62 is approximately thirteen and one-quarter inches, while the outer diameter of the top portion annular groove 62 is approximately twenty and one-half inches.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, other types of fastening devices besides butterfly latches may be utilized to seal the container in its closed position. Furthermore, various types of hardware may be utilized in the supporting and holding means. The container may also be constructed from different types of impact-resistant material. Accordingly, it is to be understood that the present invention is not limited to the precise construction as shown in the drawings and described hereinabove.

I claim:

1. A clamshell type reusable container for shipping and storing aircraft brake disk assemblies comprising:
   a generally cylindrical tube having a first and a second end, said tube further being axially divided so as to comprise a separable right half and a separable left half, each of the halves further including a first edge and a second edge extending down the length of the tube;
   a top portion attached to the first end of the cylindrical tube, said top portion further being divided so as to form a separable right top portion half corresponding to the cylindrical tube right half, and a separable left top portion half corresponding to the cylindrical tube left half;
   a base portion attached to the second end of the cylindrical tube said base portion further being divided so as to form a separable right base portion half corresponding to the cylindrical tube right half, and a left base portion half corresponding to the cylindrical tube left half;
   means for securing the left halves and the right halves of the cylindrical tube, top portion, and base portion together such that the left and right halves may pivot between an open position and a closed position; and
   means for supporting and holding the brake disk assembly in a fixed position within the cylindrical tube, said supporting and holding means mechanically engaging the brake disk assembly, the base portion, and the top portion, preventing movement of the brake disk assembly when the two halves of the container are secured together.

2. A clamshell reusable container for shipping and storing aircraft brake disk assemblies in accordance with claim 1 wherein the supporting and holding means comprises:
   a base nut plate, having an upper and a lower surface;
   a base nut mounted on the upper surface of the base nut plate;
   a threaded rod having an upper end, a lower end, and a central portion, wherein the lower end is screwed into the base nut and the upper end extends to the top portion of the tube such that the rod is aligned with the vertical axis of the cylindrical tube when the supporting and holding means is engaging the top portion and the base portion;
   a lower truncated conical member molded onto the lower end of the threaded rod with the truncated end facing the central portion of the threaded rod;
   a upper truncated conical member removably threaded onto the rod such that the truncated end is facing the central portion of the threaded rod;
   a wing nut removably threaded onto the upper end of the threaded rod above the upper conical member; and
   a cap screw removably threaded onto the top of the upper end of the threaded rod above the wing nut;
   wherein, after the upper conical member, the wind nut, and the cap screw are removed from the threaded rod, the brake assembly may be slid over the threaded rod so as to engage the lower conical member, the upper conical member is slid back over the threaded rod, the wing nut is tightened onto the threaded rod so as to cause the upper conical member to contact the brake assembly, and the cap screw is tightened onto the top of the threaded rod, and further wherein the cap screw interfits with the top portion and a portion of the lower conical member interfits with the base portion, such that when the supporting and holding mesn mechanically engages both the top portion and the base portion, the threaded rod and the upper and lower conical members support and hold the brake assembly in position.

3. A clamshell reusable container for shipping and storing aircraft brake disk assemblies in accordance with claim 2 wherein the supporting and holding means further comprises means for lifting the brake assembly with a hook.

4. A clamshell reusable container for shipping and storing aircraft brake disk assemblies in accordance with claim 3 wherein said lifting means comprises a band that loops around the cap screw thereby providing a loop by which a hook can lift the brake assembly.

5. a clamshell reusable container for shipping and storing aircraft brake disk assemblies in accordance with claim 1 wherein the securing means comprises:
   a plurality of hinge members for connecting one edge of the cylindrical tube right half to the corresponding edge of the cylindrical tube left half, said hinge members being disposed such that the left and the right halves pivot open to expose the center of the cylindrical tube, or pivot shut to close the cylindrical tube;
   means for temporarily fastening the opposite edge of the left half of the container to the corresponding edge of the right half of the container when the container is in a closed position.

6. A clamshell reusable container for shipping and storing aircraft brake disk assemblies in accordance with claim 5 wherein said fastening means is comprised of at least one butterfly latch.

7. A clamshell reusuable container for shipping and storing aircraft brake disk assemblies in accordance with claim 6 wherein four butterfly latches are used, two of said latches being located on the outer surface of the cylindrical tube in close proximity to the first edges of the cylindrical tube, one latch being located on the bottom surface of the base portion halves, and one latch being located on the top surface of the top portion halves.

8. A clamsheel reusable container for shipping and storing aircraft brake disk assemblies in accordance with claim 1 wherein at least one edge of the cylindrical tube halves is formed with a duct extending down the length of the edge, and the corresponding edge of the opposite cylindrical tube half is formed with a ridge extending down the length of the edge and corresponds to the duct, such that the corresponding edges do not shift in relation to each other when the container is closed.

9. A clamshell reusable container for shipping and storing aircraft brake disk assemblies in accordance with claim 1 wherein a selected one of the top portion or base portion further comprises an annular groove, and the remaining top or base portion further comprises an annular ridge, such that the ridge fits into the groove when the containers are stacked.

10. A clamshell reusable container for shipping and storing aircraft brake disk assemblies in accordance with claim 1 wherein the circumference of the base portion and the circumference of the top portion are larger than the circumference of the cylindrical tube.

11. A clamshell reusable container for shipping and storing aircraft brake disk assemblies in accordance with claim 1 wherein the cylindrical tube, top portion, and base portion are rotationally molded from a high density polyethylene material.

12. A clamshell resusable container for shipping and storing aircraft brake assemblies comprising:
- a cylindrical tube having a first and a second end, said tube having a top portion attached to the frist end of the cylindrical tube and a base portion attached to the second end of the cylindrical tube, said tube further being cross-sectionally divided so as to comprise a right half and a left half;
- means for securing the left half and the right half together such that the left and right halves may shift in its configuration between an open position and a closed position;
- means for supporting and holding the brake assembly within the cylindrical tube, the supporting and holding means mechanically interfitting with the base portion and the top portion of the container;
- means for removing and replacing the brake assemblies from and into the two halves of the container when the container is in an open position.

13. A clamshell reusable container for shipping and storing aircraft brake disk assemblies in accordance with claim 12 wherein the removing and replacing means comprises a strap member that surrounds the circumference of the brake assembly in at least two parallel spaced apart areas, wherein the strap tightens around the circumference of the assembly when the assembly is lifted, and further wherein the strap provides a loop to which a hook can connect for lifting the brake assembly.

14. A clam-shell reusable container for shipping and storing aircraft brake disk assemblies in accordance with claim 12 wherein the supporting and holding means comprises:
- a base nut plate, having an upper and a lower surface;
- a base nut mounted on the upper surface of the base nut plate;
- a threaded rod having an upper end, a lower end, and a central portion, wherein the lower end is screwed into the base nut and upper end extends to the top portion of the tube such that the rod is aligned with the vertical axis of the cylindrical tube when the supporting and holding means is interconnected with the top base portion and the base top portion;
- a lower truncated conical member molded onto the lower end of the threaded rod with the truncated end facing the central portion of the threaded rod;
- a upper truncated conical member removably threaded onto the rod such that the truncated end is facing the central portion of the threaded rod;
- a wing nut removably threaded onto the upper end of the threaded rod above the upper conical member; and
- a cap screw removably threaded onto the top of the upper end of the threaded rod above the wing nut;
- wherein, the brake assembly engages the threaded rod, the lower conical member, and the upper conical member in order to support and hold the brake assembly in a fixed position.

15. A clamshell reusable container for shipping and storing aircraft brake disk assemblies in accordance with claim 14 wherein the supporting and holding means further comprises a band that loops around the cap screw thereby providing a loop by which a hook can lift the brake assembly.

16. A clam shell reusable container for shipping and storing aircraft brake disk assemblies in accordance with claim 12 wherein a selected one of the top portion or base portion further comprises an annular groove, and the remaining top or base portion further comprises an annular ridge, such that the ridge fits into the groove when the containers are stacked.

17. A clamshell reusable container for shipping and storing aircraft brake assemblies comprising;
- a cylindrical tube having a first and a second end, said tube having a top portion attached to the first end of the cylindrical tube and a base portion attached to the second end of the cylindrical tube, said tube further being cross-sectionally divided so as to comprise a right half and a left half;
- means for securing the left half and the right half together such that the left and right halves may shift in configuration between an open position and a closed position; and
- means for supporting and holding the brake assembly within the cylindrical tube, the supporting and holding means mechanically interfitting with the base portion and the top portion of the container.

18. A clamshell reusable container for shipping and storing aircraft brake disk assemblies in accordance with claim 17 wherein the securing means comprises:
- a plurality of hinge members for connecting an edge of the cylindrical tube right half to a corresponding edge of the cylindrical tube left half, said hinge members being disposed such that the left and the right halves can pivot open to expose the center of the cylindrical tube, or pivot shut to close the cylindrical tube; and
- means for temporarily fastening the left half of the container to the right half of the container when the container is in a closed position.

19. A device for protecting an aircraft brake assembly during shipment and storage comprising:
- a cylindrical tube having a first and a second end;
- a base portion attached to said first end;
- a top portion attached to said second end;
- wherein each of the cylindrical tube, base portion, and top portion are cross-sectionally divided in half along the axis of the cylindrical tube so as to form two container halves, each container half having a first cut edge and a second cut edge and further wherein the first cut edges are secured together so as to allow the two container halves to pivot from an open position to a closed position; and means for supporting and holding the aircraft brake assembly within the container halves, the supporting and holding means being interconnectable with the top portion and the base portion of the container.

20. A container for protecting an aircraft brake assembly during shipment and storage in accordacne with claim 19 wherein the supporting and holding means comprises:

a base nut plate, having an upper and a lower surface;

a base nut mounted on the upper surface of the base nut plate;

a threaded rod having an upper end, a lower end, and a central portion, wherein the lower end is screwed into the base nut and upper end extends to the top portion of the tube such that the rod is aligned with the vertical axis of the cylindrical tube when the supporting and holding means is interconnected with the top portion and the base portion;

a lower truncated conical member molded onto the lower end of the threaded rod with the truncated end facing the central portion of the threaded rod;

a upper truncated conical member removably threaded onto the rod such that the truncated end is facing the central portion of the threaded rod;

a wing nut removably threaded onto the upper end of the threaded rod above the upper conical member; and a cap screw removably threaded onto the top of the upper end of the threaded rod above the wing nut;

wherein, the brake assembly engages the threaded rod, the lower conical member, and the upper conical member so as to support and hold the brake assembly in a fixed position.

* * * * *